United States Patent
Ting

(10) Patent No.: US 10,754,460 B2
(45) Date of Patent: Aug. 25, 2020

(54) PORTABLE ELECTRONIC DEVICE

(71) Applicant: Primax Electronics Ltd., Taipei (TW)

(72) Inventor: Kuan-Pao Ting, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 289 days.

(21) Appl. No.: 15/936,168

(22) Filed: Mar. 26, 2018

(65) Prior Publication Data

US 2019/0179462 A1 Jun. 13, 2019

(30) Foreign Application Priority Data

Dec. 8, 2017 (TW) .............................. 106143188 A

(51) Int. Cl.
*G06K 9/00* (2006.01)
*G06F 3/041* (2006.01)
*G06F 1/16* (2006.01)

(52) U.S. Cl.
CPC .......... *G06F 3/0412* (2013.01); *G06F 1/1658* (2013.01); *G06K 9/00006* (2013.01)

(58) Field of Classification Search
None
See application file for complete search history.

(56) References Cited

U.S. PATENT DOCUMENTS

| | | | |
|---|---|---|---|
| 2013/0093697 A1* | 4/2013 | Sun | G06F 3/0412 345/173 |
| 2013/0188366 A1* | 7/2013 | Russell-Clarke | H05K 5/0017 362/362 |
| 2015/0363629 A1* | 12/2015 | Lee | G06K 9/0002 345/173 |
| 2017/0271546 A1* | 9/2017 | Hou | G06K 9/00013 |
| 2017/0300736 A1* | 10/2017 | Song | G06K 9/00033 |
| 2018/0039815 A1* | 2/2018 | Jung | G06K 9/00013 |
| 2019/0213376 A1* | 7/2019 | Yi | G02B 6/0031 |

* cited by examiner

*Primary Examiner* — Sean M Conner
(74) *Attorney, Agent, or Firm* — Kirton McConkie; Evan R. Witt

(57) ABSTRACT

The present invention provides a portable electronic device, including: a touch panel; a display module, disposed below the touch panel; an optical fingerprint sensor module, disposed below the display module; a transparent frame, disposed between the display module and the optical fingerprint sensor module, and including: a first surface, for combining with the display module; a second surface, for combining with the optical fingerprint sensor module; and an opening, running through the first surface and the second surface, and a filler type ultraviolet (UV) curable optically clear adhesive (OCA) being filled into the opening; and a housing, for combining with the touch panel.

11 Claims, 6 Drawing Sheets

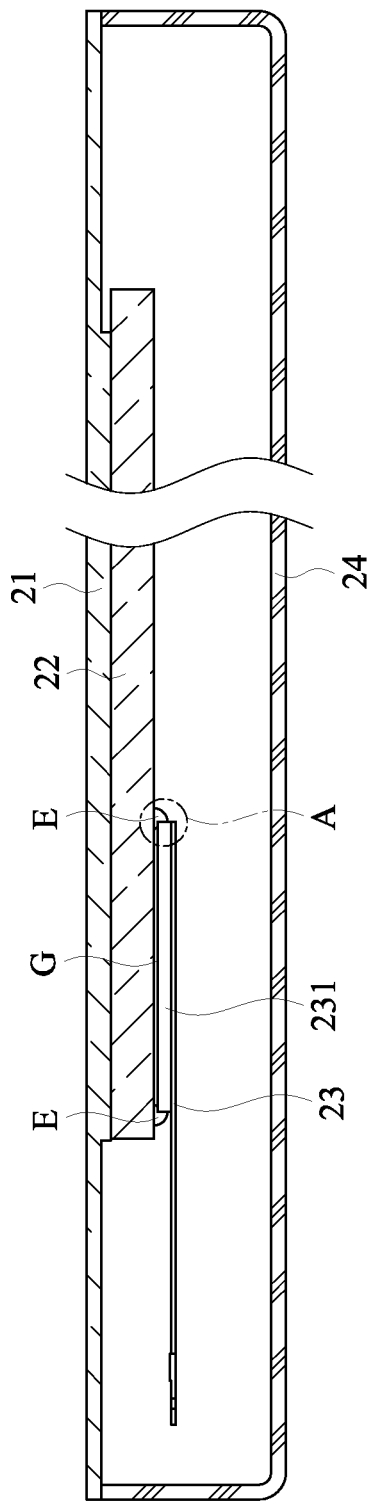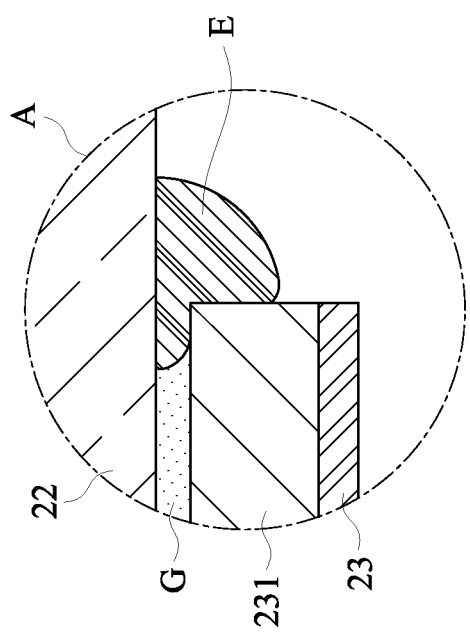
FIG. 1A
FIG. 1B

PORTABLE ELECTRONIC DEVICE

FIELD OF THE INVENTION

The present invention relates to an electronic device, and in particular, to a portable electronic device.

BACKGROUND OF THE INVENTION

A fingerprint recognition module has gradually become one of standard configurations for a portable electronic device. A user may perform identity identification by using a fingerprint recognition module, to unlock the portable electronic device, or to execute an application.

A detection mode of the fingerprint recognition module may be divided into a capacitive fingerprint sensing technology and an optical fingerprint sensing technology. In the prior art, settings of an optical fingerprint recognition module are shown in FIG. 1A and FIG. 1B. FIG. 1A is a sectional view of a portable electronic device in the prior art. FIG. 1B is an enlarged view of an area A in FIG. 1A. In FIG. 1A, the portable electronic device 20 includes: a touch panel 21, a display module 22, an optical fingerprint sensor module 23, and a housing 24. The housing 24 is combined with the touch panel 21 to form a closed accommodating space, and is provided with and used for accommodating an electronic component (not shown) inside the portable electronic device 20. The optical fingerprint sensor module 23 includes an optical fingerprint sensor chip 231, and a layer of ultraviolet (UV) curable optically clear adhesive (OCA) G may be formed on a surface of the optical fingerprint sensor chip 231, to bind and fix the optical fingerprint sensor module 23 under the display module 22 by using the UV curable OCA G. On the other hand, an epoxy resin (epoxy) E may be coated on a junction of the optical fingerprint sensor chip 231 and the display module 22, to increase structural strength of the combination of the optical fingerprint sensor module 23 and the display module 22. However, the UV curable OCA G between the optical fingerprint sensor module 23 and the display module 22 easily spreads to another non-adhesive area on a surface of the display module 22 after being pressed. Moreover, if the optical fingerprint sensor module 23 is under uneven pressure during adhesion, a thickness of the UV curable OCA G is easily made uneven. Consequently, the optical fingerprint sensor chip 231 is twisted and cannot be smoothly adhered to the surface of the display module 22, causing the optical fingerprint sensor chip 231 to produce some errors when receiving light. On the other hand, the epoxy resin E coated on the junction of the optical fingerprint sensor chip 231 and the display module 22 may also spread to an area provided with the UV curable OCA G or the surface of the optical fingerprint sensor chip 231, affecting an effect of image capturing of a fingerprint feature by the optical fingerprint sensor chip 231.

In view of this, how to reduce a probability of twisting when an optical fingerprint sensor module of a portable electronic device and a display module are bound together, and prevent an epoxy resin used for increasing structural strength from spreading to an area provided with a UV curable OCA and a surface of an optical fingerprint sensor chip are technical problems to be resolve by the present invention.

SUMMARY OF THE INVENTION

A main objective of the present invention is to provide a portable electronic device and an assembly structure of an optical fingerprint sensor module thereof, which can reduce a probability of twisting when an optical fingerprint sensor module and a display module are bound together, and can prevent an epoxy resin used for increasing structural strength from spreading to an area provided with a UV curable OCA and a surface of an optical fingerprint sensor chip.

To achieve the foregoing objective, the present invention provides a portable electronic device, including:
 a touch panel;
 a display module, disposed below the touch panel;
 an optical fingerprint sensor module, disposed below the display module;
 a transparent frame, disposed between the display module and the optical fingerprint sensor module, and including:
  a first surface, for combining with the display module;
  a second surface, for combining with the optical fingerprint sensor module; and
  an opening, running through the first surface and the second surface, and a filler type UV curable OCA being filled into the opening; and
 a housing, for combining with the touch panel.

In the foregoing preferred implementation, the optical fingerprint sensor module includes: a substrate, an optical fingerprint sensor chip disposed on the substrate, and a flexible printed circuit board, where the substrate is fixed to the flexible printed circuit board and is electrically connected to the flexible printed circuit board.

In the foregoing preferred implementation, a first adhesive-type UV curable OCA is formed on the second surface and used for binding the transparent frame and the optical fingerprint sensor chip together, and the opening corresponds to the optical fingerprint sensor chip.

In the foregoing preferred implementation, an epoxy resin is formed at a junction of the optical fingerprint sensor chip and the second surface.

In the foregoing preferred implementation, a material of the transparent frame is: polymethylmethacrylate (PMMA) or cyclic olefin copolymer (COC).

In the foregoing preferred implementation, a thickness of the transparent frame is 0.4 mm.

In the foregoing preferred implementation, an outer surface of a frame body of the transparent frame is provided with a black ink layer, and a thickness of the black ink layer is between 0.01 mm and 0.02 mm.

In the foregoing preferred implementation, a second adhesive-type UV curable OCA is formed on the first surface and used for binding the transparent frame and the display module together.

In the foregoing preferred implementation, a material of the touch panel is: sapphire crystal glass, tempered glass, or plastic cement.

In the foregoing preferred implementation, the display module is: a liquid crystal display (LCD), a light-emitting diode (LED) display, a micro LED display, or a field emission display (FED).

In the foregoing preferred implementation, the portable electronic device is: a personal digital assistant (PDA) or a smartphone.

BRIEF DESCRIPTION OF THE DRAWINGS

FIG. 1A is a sectional view of a portable electronic device in the prior art;
FIG. 1B is an enlarged view of an area A in FIG. 1A.

DETAILED DESCRIPTION OF THE PREFERRED EMBODIMENT

Advantages and features of the present invention and a method for implementing same will be described in a more detailed way with reference to exemplary embodiments and accompanying drawings, so as to be more easily understood. However, the present invention may be implemented in different forms and should not be construed as being limited only to the embodiments stated herein. On the contrary, for a person of ordinary skill in the art, these provided embodiments make the present disclosure more thoroughly, comprehensively, and completely convey the scope of the present invention.

Figure 2:
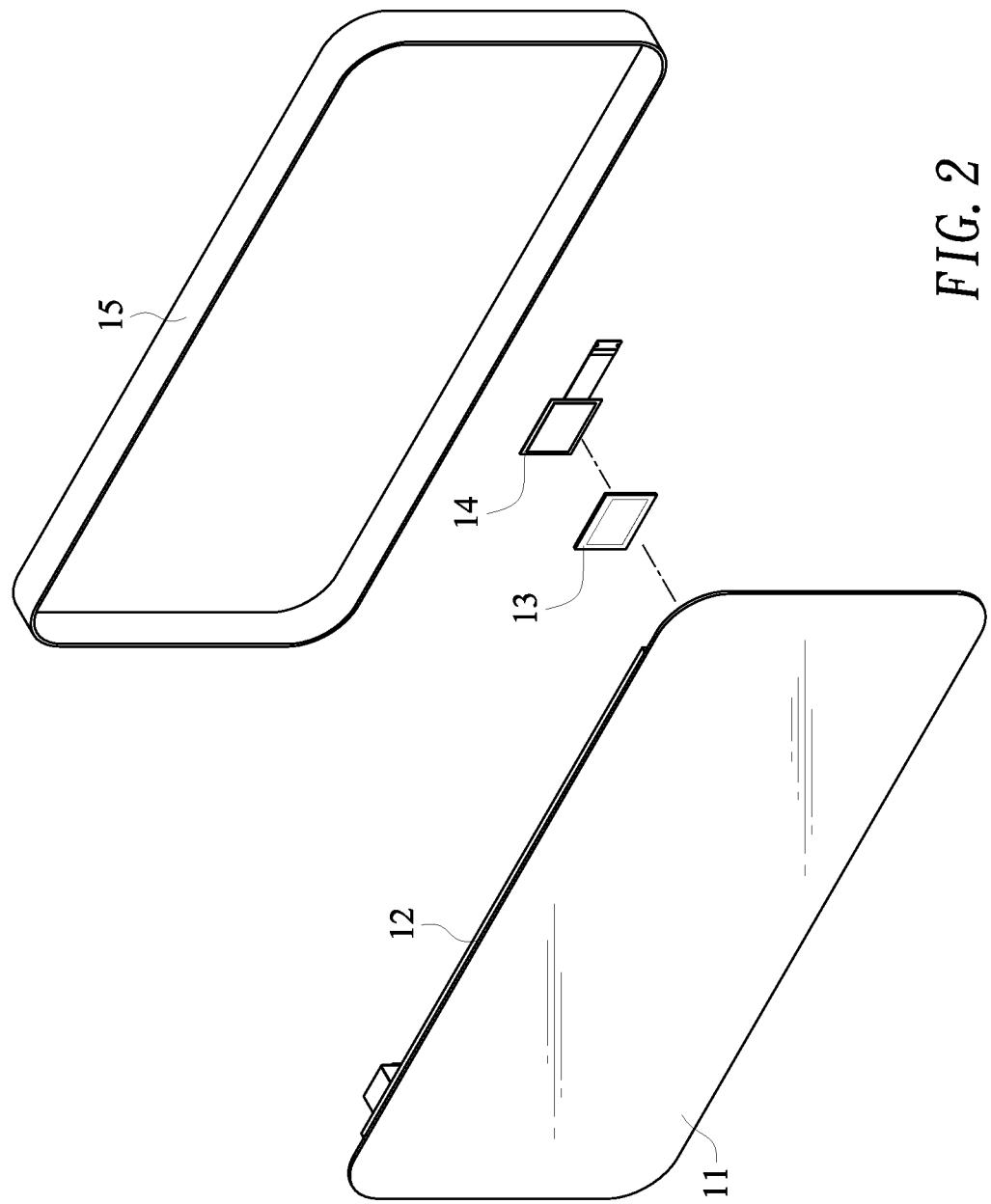
FIG. 2 is a three-dimensional schematic view of a portable electronic device according to the present invention.

First, referring to FIG. 2, FIG. 2 is a three-dimensional schematic view of a portable electronic device according to the present invention. In FIG. 2, the portable electronic device 10 includes: a touch panel 11, a display module 12, a transparent frame 13, an optical fingerprint sensor module 14, and a housing 15.

Still referring to FIG. 2, the display module 12 is disposed below the touch panel 11. A user may view media or information displayed by the display module 12 by using the touch panel 11, and may touch the touch panel 11 to operate the portable electronic device 10. The transparent frame 13 is disposed between the display module 12 and the optical fingerprint sensor module 14 and used for binding the display module 12 and the optical fingerprint sensor module 14 to together, so that the optical fingerprint sensor module 14 may be fixedly disposed below the display module 12 by using the transparent frame 13. The housing 15 is combined with the touch panel 11 to form a closed accommodating space, and is provided with and used for accommodating an electronic component (not shown) inside the portable electronic device 10. In this embodiment, the portable electronic device 10 may be: a PDA or a smartphone. The display module 12 may be: an LCD, an LED display, a micro LED display, or an FED. In a preferred implementation, the display module 12 may be an active-matrix organic LED (AMOLED) display. The touch panel 11 is made of a transparent material such as sapphire crystal glass, tempered glass, or plastic cement. A touch control mode of the touch panel 11 may be: resistive touch control, capacitive touch control, sonic touch control, optical touch control, or electromagnetic touch control. The transparent frame 13 is a transparent structure made of optical plastics such as PMMA or COC. A thickness of the transparent frame 13 is 0.4 mm.

Figure 3A:
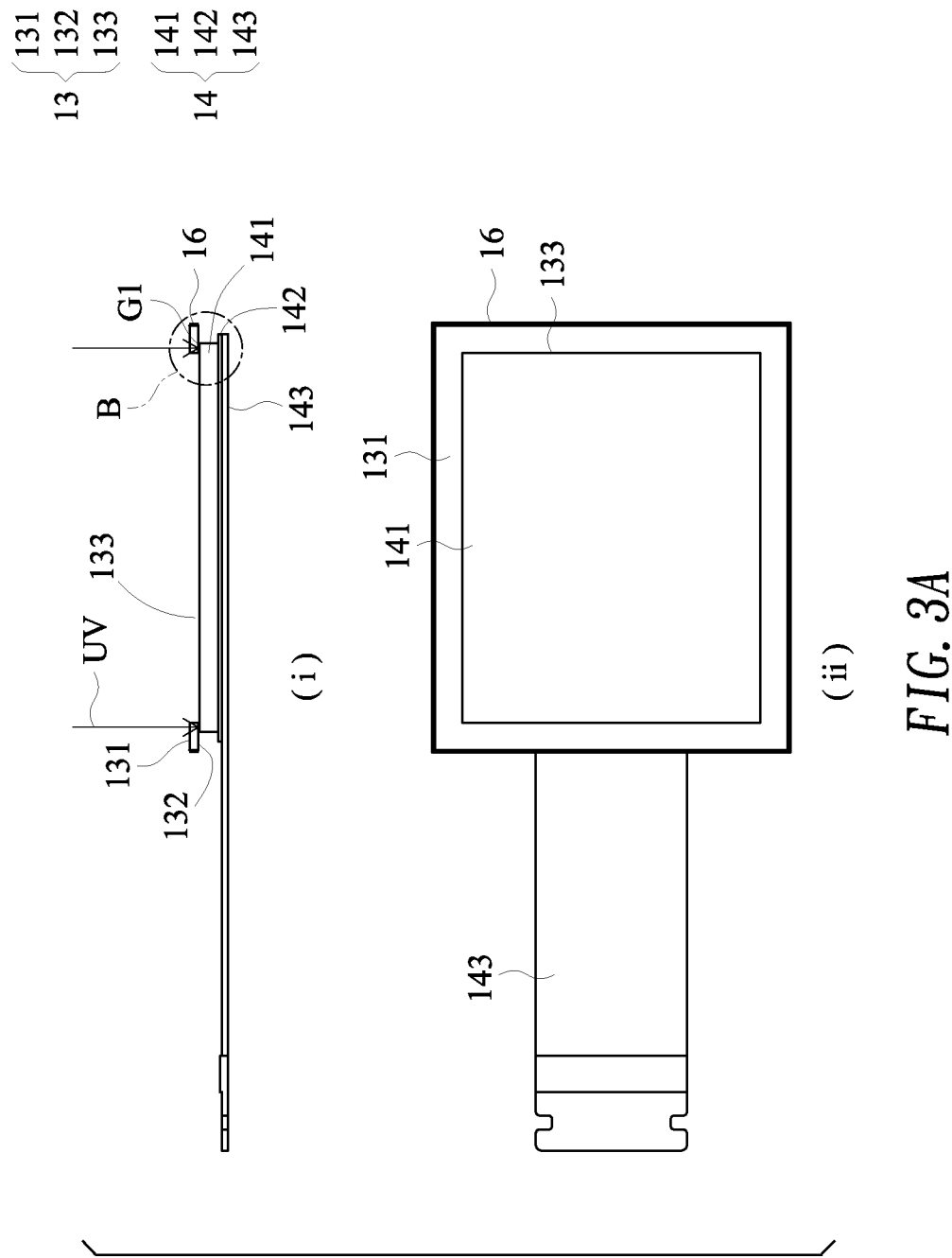
FIG. 3A is a schematic view showing that an optical fingerprint sensor module and a transparent frame are bound together.
Figure 3B:
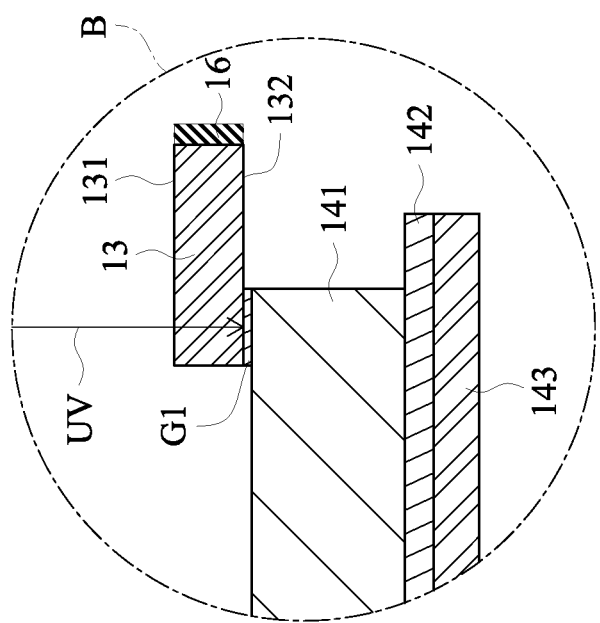
FIG. 3B is an enlarged view of an area B in FIG. 3A.

Referring to FIG. 3A and FIG. 3B, FIG. 3A is a schematic view showing that the optical fingerprint sensor module and the transparent frame are bound together, and FIG. 3B is an enlarged view of an area B in FIG. 3A. For ease of description, (i) in FIG. 3A is a sectional view of the transparent frame 13 and the optical fingerprint sensor module 14; and (ii) of FIG. 3A is a top view of the transparent frame 13 and the optical fingerprint sensor module 14. In FIG. 3A, the transparent frame 13 includes a first surface 131, a second surface 132, and an opening 133 running through the first surface 131 and the second surface 132. In addition, a black ink layer 16 used for shading is formed on an outer surface of a frame body of the transparent frame 13 by means of spraying or printing, and a thickness of the black ink layer 16 is between 0.01 mm and 0.02 mm. The optical fingerprint sensor module 14 includes: an optical fingerprint sensor chip 141, a substrate 142, and a flexible printed circuit board 143. The optical fingerprint sensor chip 141 is disposed on the substrate 142. The substrate 142 is fixed to the flexible printed circuit board 143 by using a surface-mount technology (SMT) and is electrically connected to the flexible printed circuit board 143.

Still referring to FIG. 3A and FIG. 3B, first, the transparent frame 13 is placed on the optical fingerprint sensor chip 141, and a first adhesive-type UV curable OCA G1 may be coated on an area (shown in FIG. 3B) in which the second surface 132 is in contact with a surface of the optical fingerprint sensor chip 141. Subsequently, the first adhesive-type UV curable OCA G1 is irradiated by UV, so that the first adhesive-type UV curable OCA G1 generates a light curing reaction, to bind the optical fingerprint sensor chip 141 to the second surface 132 of the transparent frame 13. In (ii) of FIG. 3A, the transparent frame 13 is bound to the surface of the optical fingerprint sensor chip 141, and the opening 133 of the transparent frame 13 is a position corresponding to the optical fingerprint sensor chip 141.

Figure 4A:
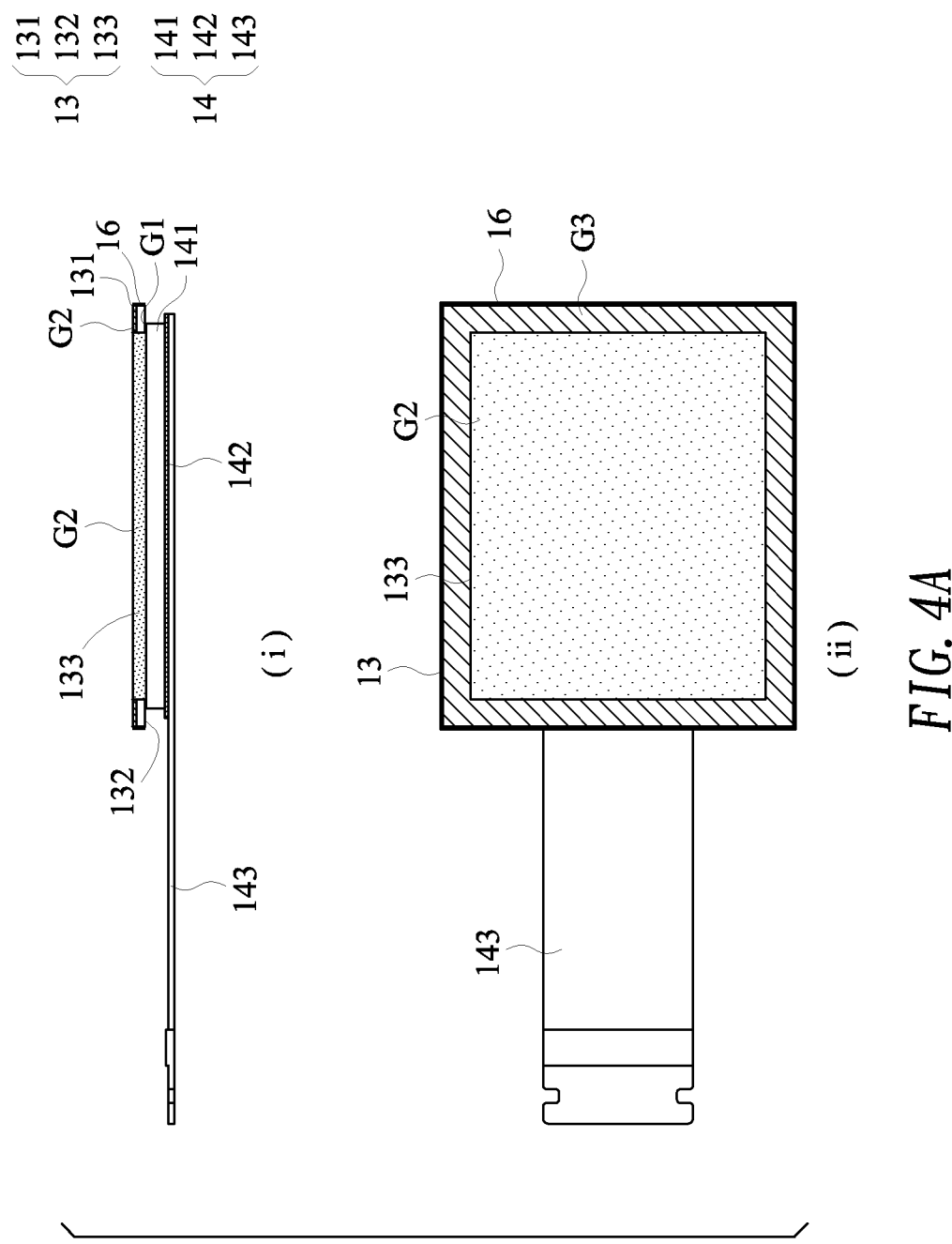
FIG. 4A and FIG. 4B are schematic views showing that a display module and the transparent frame are bound together.
Figure 4B:
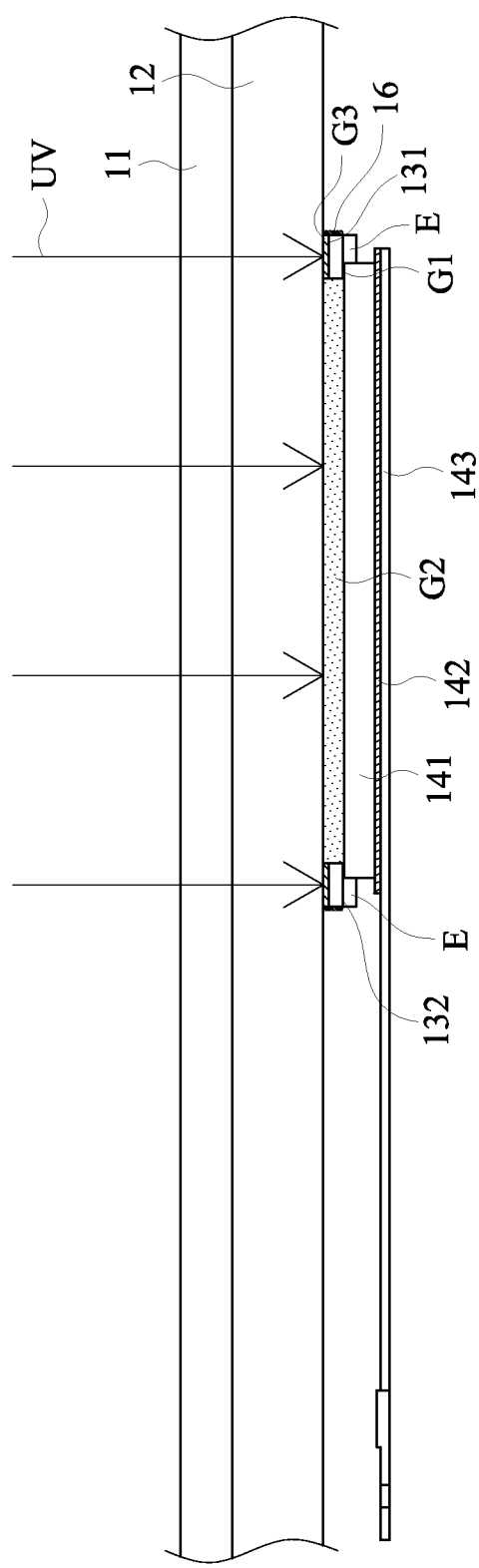

Referring to FIG. 4A and FIG. 4B, FIG. 4A and FIG. 4B are schematic views showing that the display module and the transparent frame are bound together. For ease of description, (i) in FIG. 4A is a sectional view of the transparent frame 13 and the optical fingerprint sensor module 14; and (ii) of FIG. 4A is a top view of the transparent frame 13 and the optical fingerprint sensor module 14. In FIG. 4A, after the optical fingerprint sensor chip 141 and the transparent frame 13 are bound together, a second adhesive-type UV curable OCA G3 may be subsequently coated on the first surface 131 of the transparent frame 13, and a filler type UV curable OCA G2 is filled into the opening 133. In addition to being used for subsequent binding, the second adhesive-type UV curable OCA G3 coated on the first surface 131 may also be used as a stop portion, to stop the filler type UV curable OCA G2 filled into the opening 133, and prevent the filler type UV curable OCA G2 from flowing out of the opening 133.

Still referring to FIG. 4B, after the filler type UV curable OCA G2 and the second adhesive-type UV curable OCA G3 are placed, the transparent frame 13 is bound under the display module 12. A surface of the display module 12 abuts the filler type UV curable OCA G2 and the second adhesive-type UV curable OCA G3. Subsequently, the filler type UV curable OCA G2 and the second adhesive-type UV curable OCA G3 are irradiated by UV, to cause the filler type UV curable OCA G2 and the second adhesive-type UV curable OCA G3 to generate a light curing reaction, so that the transparent frame 13 may be bound to the surface of the display module 12 by using the second adhesive-type UV curable OCA G3 placed on the first surface 131 and the filler type UV curable OCA G2 filled into the opening 133. The optical fingerprint sensor module 14 may be fixedly disposed below the display module 12 by means of the combination of the transparent frame 13 and the filler type UV curable OCA G2.

Still referring to FIG. 4B, the transparent frame 13 is a transparent structure made of optical plastics such as PMMA or COC. Therefore, both the transparent frame 13 and the filler type UV curable OCA G2 in the opening 133 may be used as a light guiding structure of the optical fingerprint sensor module 14, without affecting light reception by the optical fingerprint sensor chip 141. In addition, when light passes through the transparent frame 13, the black ink layer 16 on the outer surface of the transparent frame 13 can also be used for shading, thereby avoiding light leakage. Further, an epoxy resin E may be coated on a junction of the optical fingerprint sensor chip 141 and the second surface 132 of the transparent frame 13, to increase structural strength of the combination of the optical fingerprint sensor module 14 and the transparent frame 13. In this embodiment, because the filler type UV curable OCA G2 is filled into the opening 133 of the transparent frame 13, the filler type UV curable OCA G2 can be prevented from spreading to another non-adhesive area on the surface of the display module 12 after being pressed by the display module 12 and the optical fingerprint sensor module 14. In addition, because the transparent frame 13 has a fixed structural shape and thickness, an uneven thickness of the filler type UV curable OCA G2 caused by uneven forces can be effectively prevented, thereby reducing a probability of twisting during adhesion of the optical fingerprint sensor module 14. On the other hand, the transparent frame 13 can also be used for segmenting the filler type UV curable OCA G2 and the epoxy resin E, to prevent the epoxy resin E used for increasing the structural strength from spreading to the surface of the optical fingerprint sensor chip 14 or the area filled by the filler type UV curable OCA G2, thereby improving an effect of image capturing of a fingerprint feature by the optical fingerprint sensor chip 14.

Compared with the prior art, in the portable electronic device provided in the present invention, the optical fingerprint sensor module thereof can be fixedly disposed under the display module by using the transparent frame made of optical plastics, and in addition to being used for binding the optical fingerprint sensor module and the display module together, the transparent frame can also be used for preventing the UV curable OCA from spreading to another non-adhesive area on the surface of the display module after the UV curable OCA is pressed. On the other hand, because the transparent frame has a fixed structural shape and thickness, twisting can be prevented when the optical fingerprint sensor module and the display module are bound together. Further, the transparent frame can also be used for segmenting the UV curable OCA and the epoxy resin, to prevent the epoxy resin from spreading to the surface of the optical fingerprint sensor chip or the area filled by the UV curable OCA, thereby improving an image capturing effect of a fingerprint feature by the optical fingerprint sensor chip. Therefore, the present invention is actually a creation with high industrial value.

Various modifications can be made to the present invention by a person skilled in the art according to various inventive concepts without departing from the protection scope of the appended claims.

What is claimed is:

1. A portable electronic device, comprising:
    a touch panel;
    a display module, disposed below the touch panel;
    an optical fingerprint sensor module, disposed below the display module;
    a transparent frame, disposed between the display module and the optical fingerprint sensor module, and comprising:
        a first surface, for combining with the display module;
        a second surface, opposite to the first surface and for combining with the optical fingerprint sensor module;
        an outer side surface substantially perpendicular to the first surface and the second surface, the outer side surface connecting the first surface and the second surface;
        a black ink layer covering the outer side surface; and
        an opening, running through the first surface and the second surface, and a filler type ultraviolet (UV) curable optically clear adhesive (OCA) being filled into the opening, wherein the outer side surface faces away from the opening; and
    a housing, for combining with the touch panel.

2. The portable electronic device according to claim 1, wherein the optical fingerprint sensor module comprises: a substrate, an optical fingerprint sensor chip disposed on the substrate, and a flexible printed circuit board, wherein the substrate is fixed to the flexible printed circuit board and is electrically connected to the flexible printed circuit board.

3. The portable electronic device according to claim 2, wherein a first adhesive-type UV curable OCA is formed on the second surface and used for binding the transparent frame and the optical fingerprint sensor chip together, and the opening corresponds to the optical fingerprint sensor chip.

4. The portable electronic device according to claim 3, wherein an epoxy resin is formed at a junction of the optical fingerprint sensor chip and the second surface.

5. The portable electronic device according to claim 1, wherein a material of the transparent frame is: polymethylmethacrylate (PMMA) or cyclic olefin copolymer (COC).

6. The portable electronic device according to claim 1, wherein a thickness of the transparent frame is 0.4 mm.

7. The portable electronic device according to claim 1, wherein a thickness of the black ink layer is between 0.01 mm and 0.02 mm.

8. The portable electronic device according to claim 1, wherein a second adhesive-type UV curable OCA is formed on the first surface and used for binding the transparent frame and the display module together.

9. The portable electronic device according to claim 1, wherein a material of the touch panel is: sapphire crystal glass, tempered glass, or plastic cement.

10. The portable electronic device according to claim 1, wherein the display module is: a liquid crystal display (LCD), a light-emitting diode (LED) display, a micro LED display, or a field emission display (FED).

11. The portable electronic device according to claim 1, wherein the portable electronic device is: a personal digital assistant (PDA) or a smartphone.

* * * * *